(12) United States Patent
Choi et al.

(10) Patent No.: US 9,921,349 B2
(45) Date of Patent: Mar. 20, 2018

(54) DISPLAY DEVICE

(71) Applicant: SAMSUNG DISPLAY CO., LTD., Yongin, Gyeonggi-Do (KR)

(72) Inventors: Suk Choi, Seongnam-si (KR); Sung Ku Kang, Suwon-si (KR); In Nam Lee, Seoul (KR); Heung Seok Go, Yongin-si (KR); Young Do Kim, Cheonan-si (KR); Jeong Heon Lee, Seoul (KR); Choon-Hyop Lee, Suwon-si (KR); Young Kuil Joo, Asan-si (KR)

(73) Assignee: Samsung Display Co., Ltd. (KR)

( * ) Notice: Subject to any disclaimer, the term of this patent is extended or adjusted under 35 U.S.C. 154(b) by 8 days.

(21) Appl. No.: 15/058,092

(22) Filed: Mar. 1, 2016

(65) Prior Publication Data

US 2016/0178821 A1    Jun. 23, 2016

Related U.S. Application Data

(62) Division of application No. 14/185,575, filed on Feb. 20, 2014, now Pat. No. 9,310,638.

(30) Foreign Application Priority Data

Sep. 2, 2013    (KR) .................. 10-2013-0104911

(51) Int. Cl.
*C09K 19/00* (2006.01)
*G02B 5/30* (2006.01)
(Continued)

(52) U.S. Cl.
CPC ............ *G02B 5/3016* (2013.01); *G02B 1/08* (2013.01); *G02B 1/11* (2013.01); *G02B 1/111* (2013.01);
(Continued)

(58) Field of Classification Search
CPC ......... G02F 1/133502; G02F 1/133528; G02F 1/133541; G02F 1/13338; G02F 3/0421;
(Continued)

(56) References Cited

U.S. PATENT DOCUMENTS 7,763,330 B2    7/2010   Lub et al.
7,920,223 B2    4/2011   Nishizawa et al.
(Continued)

FOREIGN PATENT DOCUMENTS

JP     2002-031721 A    1/2002
KR   10-2010-0063292 A  6/2010
(Continued)

*Primary Examiner* — Ruiyun Zhang
(74) *Attorney, Agent, or Firm* — Innovation Counsel LLP

(57) ABSTRACT

A display device is provided. The display device includes an anti-reflection film. The anti-reflection film includes a base film, a retardation coating layer disposed on a first side of the base film so as to delay a phase of transmitted light, and a polarizer coating layer disposed on a second side of the base film so as to allow a polarization component of the transmitted light in a specific direction to pass through, wherein the retardation coating layer and the polarizer coating layer are formed by applying a liquid crystal on the base film.

5 Claims, 17 Drawing Sheets

(51) Int. Cl.
  *G02F 1/1335* (2006.01)
  *G02B 1/111* (2015.01)
  *G02B 1/08* (2006.01)
  *G02B 1/11* (2015.01)
  *G06F 3/041* (2006.01)
  *G02F 1/13363* (2006.01)

(52) U.S. Cl.
  CPC ......... *G02B 5/3041* (2013.01); *G02B 5/3083* (2013.01); *G02F 1/133502* (2013.01); *G02F 1/133528* (2013.01); *G06F 3/0412* (2013.01); *G02F 2001/133541* (2013.01); *G02F 2001/133638* (2013.01); *Y10T 428/10* (2015.01); *Y10T 428/1041* (2015.01)

(58) Field of Classification Search
  CPC ......... G05F 3/0421; G02B 1/118; G02B 1/14; G02B 5/3016; G02B 5/3025; G02B 5/3083; G02B 5/32; Y10T 428/1036; Y10T 428/1041; Y10T 428/105

USPC ........... 428/1.1, 1.3, 1.31; 349/96, 117, 119, 349/137; 345/173; 359/601, 609
  See application file for complete search history.

(56) References Cited

U.S. PATENT DOCUMENTS

| | | | |
|---|---|---|---|
| 7,978,302 | B2 | 7/2011 | Peeters et al. |
| 8,344,396 | B2 | 1/2013 | Shim et al. |
| 2003/0011732 | A1 | 1/2003 | Ishihara et al. |
| 2004/0239641 | A1* | 12/2004 | Takahata ............. G02F 1/13338 345/173 |
| 2005/0031801 | A1 | 2/2005 | Shundo et al. |
| 2005/0249932 | A1 | 11/2005 | Wang et al. |
| 2011/0199561 | A1 | 8/2011 | Hasegawa et al. |

FOREIGN PATENT DOCUMENTS

| | | |
|---|---|---|
| KR | 10-2011-0124717 A | 11/2011 |
| KR | 10-2013-0028284 A | 3/2013 |

\* cited by examiner

DISPLAY DEVICE

CROSS-REFERENCE TO RELATED APPLICATION

This application is a divisional application of U.S. patent application Ser. No. 14/185,575 filed on Feb. 20, 2014, which claims priority to and the benefit of Korean Patent Application No. 10-2013-0104911 filed in the Korean Intellectual Property Office on Sep. 2, 2013, the entire contents of which are incorporated herein by reference.

BACKGROUND (a) Technical Field

The present disclosure relates to a display device, and more particularly, to a display device including an anti-reflection film having a thin structure.

(b) Description of the Related Art

When external light is reflected or scattered on a display surface of a display device, the image on the display device cannot be properly observed. The reflection or scattering of external light is particularly common on portable devices (such as mobile phones, PMPs (portable multimedia players), PDA (personal digital assistants), and laptop computers)) since these portable devices are often used outdoors.

Various methods have been proposed to overcome the problem of the reflection and scattering of external light on display devices. For example, an anti-reflection film may be attached to the display surface of the display device. The anti-reflection film absorbs externally reflected and scattered light, and allows only the image displayed on the display device to be transmitted, thereby producing a clearer display image.

Recently, foldable display devices having bending and folding characteristics have been developed. A foldable display device has numerous advantages over non-foldable display devices. For example, the foldable display device is highly portable and can be easily carried around. Also, a large display screen can be implemented on the foldable display device. Furthermore, the foldable display device may be used in various mobile equipment (such as mobile phones, PMPs, PDPs, navigation devices, UMPCs (ultra-mobile PCs)), may serve as a TV or a monitor, and may be used to read electronic books or electronic newspapers.

For an anti-reflection film to work properly, the anti-reflection film needs to have good adhesion to the foldable display device. However, presently developed anti-reflection films are limited to a thickness of about 100 um, which affects the bendability and curvature radius of the foldable display device. For example, at this thickness (of about 100 um), the anti-reflection film may delaminate from the foldable display device after repeated bendings/foldings.

Accordingly, to fold the foldable display device at a smaller curvature radius and to improve adhesion of the anti-reflection film to the foldable display device, an anti-reflection film having a thin structure may be required.

SUMMARY

The present disclosure is directed to address at least the above deficiencies relating to the adhesion of anti-reflection films in foldable display devices and the curvature radius of those foldable display devices.

According to some exemplary embodiments of the inventive concept, a display device including an anti-reflection film is provided. The anti-reflection film includes a base film; a retardation coating layer disposed on a first side of the base film so as to delay a phase of transmitted light; and a polarizer coating layer disposed on a second side of the base film so as to allow a polarization component of the transmitted light in a specific direction to pass through, wherein the retardation coating layer and the polarizer coating layer are formed by applying a liquid crystal on the base film.

In some embodiments, the polarizer coating layer may be disposed on the retardation coating layer.

In some embodiments, the anti-reflection film may further include an over-coating layer disposed on the polarizer coating layer.

In some embodiments, the over-coating layer may include a UV-absorber.

In some embodiments, the over-coating layer may include particles for antiglare.

In some embodiments, the display device may further include a touch screen panel, wherein the base film may be attached to the touch screen panel.

In some embodiments, the retardation coating layer may delay the phase of the transmitted light by a quarter wavelength ($\lambda/4$), and a first direction of an optical axis of the retardation coating layer and a second direction of an optical axis of the polarizer coating layer may form an angle of 45°.

In some embodiments, the optical axis of the base film may be the same as the optical axis of the retardation coating layer.

In some embodiments, the anti-reflection film may further include a second over-coating layer disposed between the retardation coating layer and the polarizer coating layer.

In some embodiments, the anti-reflection film may further include a second over-coating layer disposed on the retardation coating layer; and a second retardation coating layer disposed on the second over-coating layer, wherein the polarizer coating layer is disposed on the second retardation coating layer.

In some embodiments, the retardation coating layer may delay the phase of the transmitted light by a quarter wavelength ($\lambda/4$), and the second retardation coating layer may delay the phase of the transmitted light by a half wavelength ($\lambda/2$).

In some embodiments, an axis of a sum of vectors of a first direction of an optical axis of the retardation coating layer and a second direction of an optical axis of the second retardation coating layer may have an angle of 45° to a third direction of an optical axis of the polarizer coating layer In some embodiments, the anti-reflection film may further include an optical coating layer disposed on the polarizer coating layer, wherein the optical coating layer includes at least one of a low-reflection coating, an anti-reflection coating, and an anti-fingerprint coating.

In some embodiments, the polarizer coating layer may be disposed on the base film, and the retardation coating layer may be disposed beneath the base film.

In some embodiments, the anti-reflection film may further include an over-coating layer disposed on the polarizer coating layer; and an insulating coating layer disposed beneath the retardation coating layer.

In some embodiments, the display device may further include a touch screen panel, wherein the insulating coating layer is attached to the touch screen panel.

In some embodiments, the retardation coating layer may delay the phase of the transmitted light by a quarter wavelength ($\lambda/4$), a first direction of an optical axis of the retardation coating layer and a second direction of an optical axis of the polarizer coating layer may form an angle of 45°, and the optical axis of the base film may be the same as the optical axis of the polarizer coating layer.

In some embodiments, the polarizer coating layer may be disposed beneath the base film, the retardation coating layer may be disposed beneath the polarizer coating layer, and the anti-reflection film may further include an adhesive layer disposed beneath the retardation coating layer.

In some embodiments, the display device may further include a touch screen panel, wherein the adhesive layer is attached to the touch screen panel.

In some embodiments, the retardation coating layer may delay the phase of the transmitted light by a quarter wavelength ($\lambda/4$).

DETAILED DESCRIPTION

Figure 1:
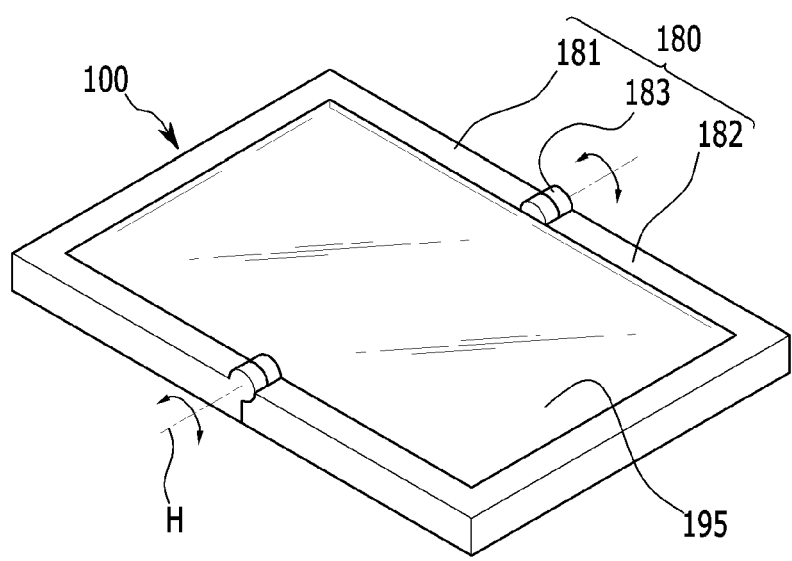
FIG. 1 illustrates a foldable display device according to an exemplary embodiment of the inventive concept.

The present inventive concept will be described more fully herein with reference to the accompanying drawings, in which exemplary embodiments are shown. As those skilled in the art would realize, the described embodiments may be modified in various ways without departing from the spirit or scope of the present disclosure.

In the embodiments, like reference numerals designate like elements having the same configuration.

In the drawings, the thicknesses of layers, films, panels, regions, etc., may be exaggerated for clarity. It will be understood that when an element such as a layer, film, region, or substrate is referred to as being "on" another element, it can be directly on the other element, or disposed on the other element with one or more intervening elements being present. In contrast, when an element is referred to as being "directly on" another element, there are no intervening elements present. Likewise, it will be understood that when an element such as a layer, film, region, or substrate is referred to as being "beneath" another element, it can be directly beneath the other element, or disposed beneath the other element with one or more intervening elements being present.

Figure 2:
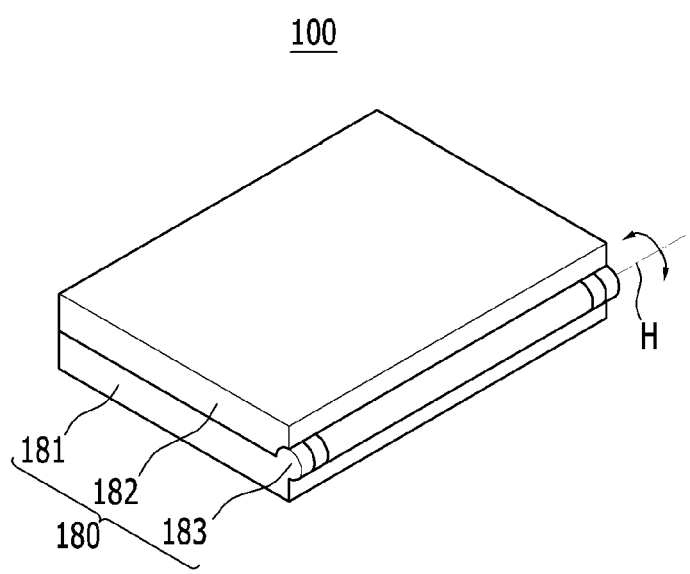
FIG. 2 illustrates the foldable display device of FIG. 1 in a folded state.

FIG. 1 illustrates a foldable display device 100 according to an exemplary embodiment of the inventive concept. FIG. 2 illustrates the foldable display device 100 of FIG. 1 in a folded state.

It should be noted that the appearance of the foldable display device 100 may be modified in various ways by one of ordinary skill in the art.

The foldable display device 100 includes a body 180 having a first portion 181, a second portion 182, and a hinge portion 183 connecting the first portion 181 and the second portion 182. The center of the hinge portion 183 forms a folding axis H when the foldable display device 100 is folded. An optical film 195 may be attached to an upper portion of a screen of the foldable display device 100 to improve the quality of the displayed image. For example, the optical film 195 may include at least one of a polarization film, an anti-reflection film, and an antiglare film to be attached to the upper portion of the screen.

A panel portion 500 (illustrated in FIG. 3) may be installed inside the body 180. The panel portion 500 will be described with reference to FIG. 3. In the interest of clarity, a description of the first portion 181, second portion 182, and hinge portion 183 of the body 180 of the foldable display device 100 of FIGS. 1 and 2 shall be omitted from the description of FIG. 3.

Figure 3:
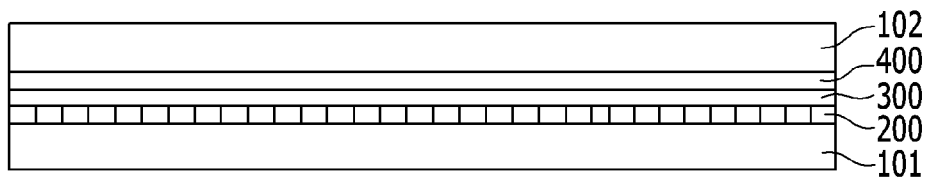
FIG. 3 is a cross-sectional view of a foldable display device according to an exemplary embodiment of the inventive concept.

FIG. 3 is a cross-sectional view of the foldable display device 100 according to an exemplary embodiment of the inventive concept.

FIG. 3 illustrates the panel portion 500 when the foldable display device 100 is in an unfolded state. The panel portion 500 includes a first protective window 101, a display panel 200 disposed on the first protective window 101, a touch screen panel 300 disposed on the display panel 200, an anti-reflection film 400 disposed on the touch screen panel 300, and a second protective window 102 disposed on the anti-reflection film 400.

The first protective window 101 and the second protective window 102 may be formed of a flexible and elastic polymer material. In some embodiments, the polymer material may be transparent. For example, the first protective window 101 and the second protective window 102 may be formed of one or more of the following materials: PMMA (polymethyl methacrylate), PDMS (polydimethylsiloxane), transparent silicon resin, and Teflon.

The display panel 200 may include a plurality of display diodes. The plurality of display diodes may include display diodes based on an organic light emitting diode (OLED) display, a liquid crystal display (LCD), a field emission display (FED), and/or a plasma display panel (PDP). Accordingly, the display panel 200 may include a display panel from any one of the following: an organic light emitting diode display, a liquid crystal display, a field emission display, or a plasma display panel.

The display panel 200 and the touch screen panel 300 may be attached together by an adhesive. The touch screen panel 300 and the anti-reflection film 400 may also be attached together by an adhesive.

Next, the touch screen panel 300 of FIG. 3 will be described with reference to FIGS. 4 and 5.

Figure 4:
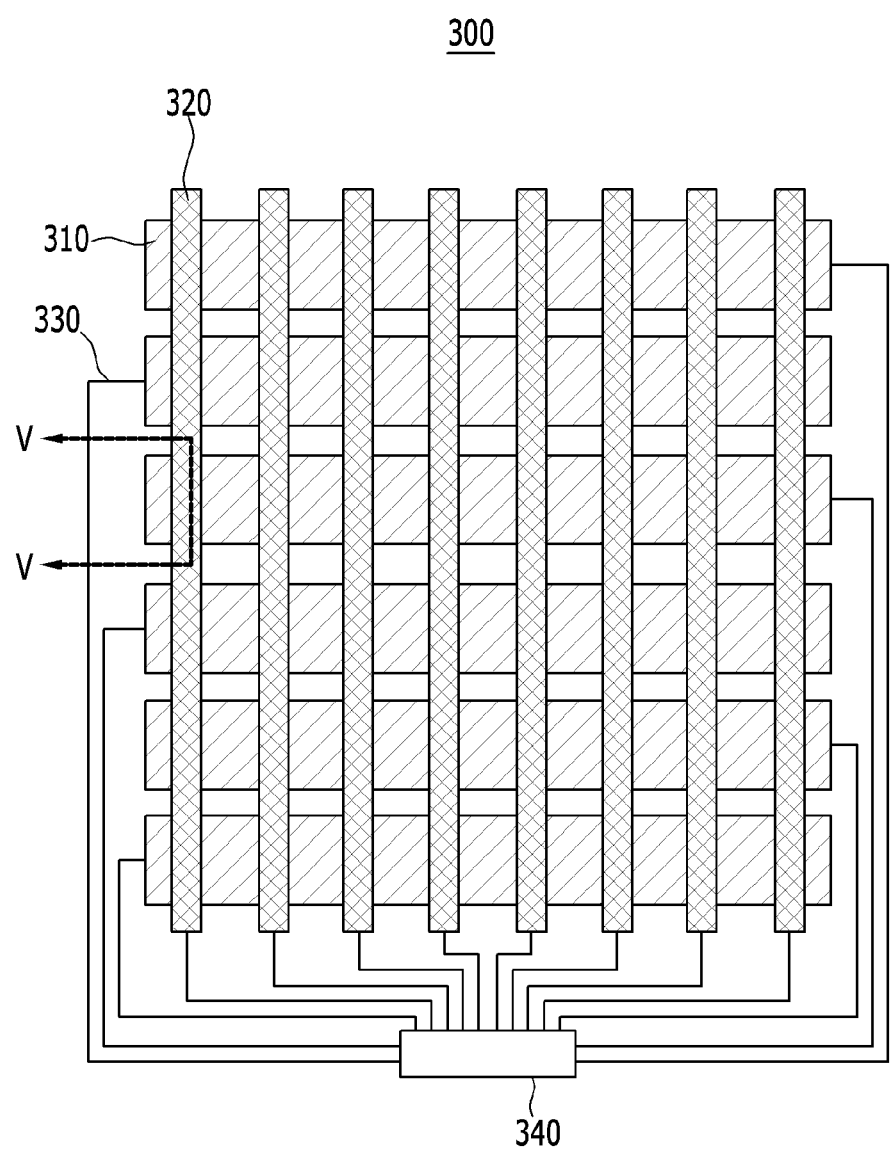
FIG. 4 is a top plan view of a touch screen panel in a foldable display device according to an exemplary embodiment of the inventive concept.

FIG. 4 is a top plan view of the touch screen panel 300 in the foldable display device 100 according to an exemplary embodiment of the inventive concept. FIG. 5 is a cross-sectional view of a touch electrode in the touch screen panel 300 of FIG. 4 (taken along line V-V of FIG. 4).

Figure 5:
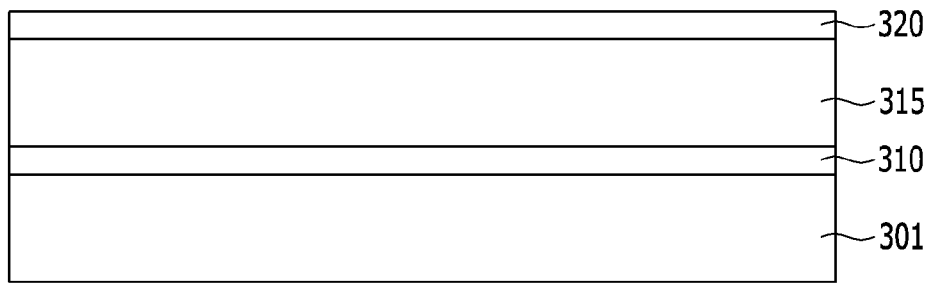
FIG. 5 is a cross-sectional view of a touch electrode of the touch screen panel of FIG. 4 (taken along line V-V of FIG. 4).

Referring to FIGS. 4 and 5, the touch screen panel 300 includes a transparent substrate 301, a plurality of driving electrodes 310 disposed on the transparent substrate 301, an insulating layer 315 disposed on the plurality of driving electrodes 310, and a plurality of sensing electrodes 320 disposed on the insulating layer 315. The plurality of driving electrodes 310 and sensing electrodes 320 are connected to a sensing circuit portion 340 through a sensing wire 330.

The transparent substrate 301 may be formed of a transparent polymer compound (such as PET (polyethylene terephthalate) or PC (polycarbonate)).

The driving electrodes 310 may be disposed in a first direction, and the sensing electrodes 320 may be disposed in a second direction that is perpendicular to the first direction. The driving electrodes 310 and the sensing electrodes 320 may be formed as a metal mesh. The metal mesh may be manufactured by fine patterning of a metal having high conductivity.

The metal mesh may be manufactured using a printing method, an imprinting method, a lithography method, or other similar methods.

The printing method includes forming a transparent electrode (or wire) directly on a substrate using a gravure or offset process. The transparent electrode (or wire) may be formed of a transparent conductive material or metal.

The imprinting method includes etching a transparent conductive layer (or metal layer) through a fine pattern to form a transparent electrode (or wire) after the fine pattern has been formed on the transparent conductive layer (or metal layer).

The lithography method includes forming a fine pattern on the substrate using a light source (such as light of a particular wavelength, a laser, or an electronic beam), and etching a transparent conductive layer (or metal layer) using the fine pattern to form a transparent electrode (or wire).

The metal mesh may include a plurality of metal patterns, and may be formed of a metal (such as copper (Cu), aluminum (Al), molybdenum (Mo), or silver (Ag)). In some embodiments, the metal patterns may have a line width of about 0.1 um to about 10 um. As previously described, the driving electrodes 310 and the sensing electrodes 320 may be formed as the metal mesh. Accordingly, the driving electrodes 310 and the sensing electrodes 320 have high conductivity and transparency.

Referring to FIG. 5, the insulating layer 315 is interposed between the driving electrodes 310 and the sensing electrodes 320, so as to separate the driving electrodes 310 from the sensing electrodes 320. The insulating layer 315 may be formed of an inorganic insulating material (such as silicon oxide ($SiO_2$) or silicon nitride (SiNx)). In some embodiments, the insulating layer 315 may be formed of an organic insulating material (such as a cellulose derivative, an olefin-based resin, an acryl-based resin, a vinyl chloride-based resin, a styrene-based resin, a polyester-based resin, a polyamide-based resin, a polycarbonate-based resin, a polycycloolefin resin, or an epoxy resin).

Since the driving electrodes 310 and the sensing electrodes 320 are separated by the insulating layer 315, a capacitance therefore results between the driving electrodes 310 and the sensing electrodes 320.

The sensing circuit portion 340 may be configured to apply a touch detection signal to the driving electrodes 310. Also, the sensing circuit portion 340 may be configured to sense a change in capacitance through the sensing electrodes 320 so as to detect a touch position.

Next, the anti-reflection film 400 of FIG. 3 (that is disposed on the touch screen panel 300) will be described with reference to FIGS. 6 to 10.

Figure 6:
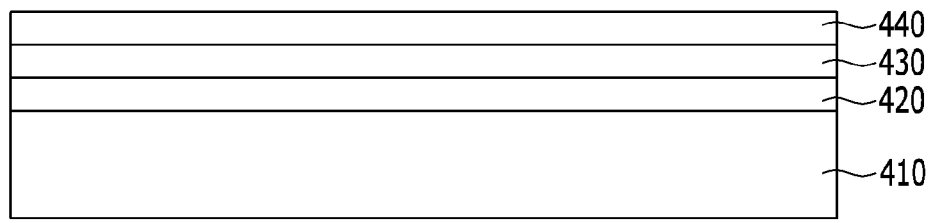
FIG. 6 is a cross-sectional view of an anti-reflection film according to an exemplary embodiment of the inventive concept.

FIG. 6 is a cross-sectional view of the anti-reflection film 400 according to an exemplary embodiment of the inventive concept.

Referring to FIG. 6, the anti-reflection film 400 includes a base film 410, a retardation coating layer 420 disposed on the base film 410, a polarizer coating layer 430 disposed on the retardation coating layer 420, and an over-coating layer 440 disposed on the polarizer coating layer 430.

The base film 410 may serve as a substrate for the anti-reflection film 400. As previously mentioned, the anti-reflection film 400 is attached to the touch screen panel 300. The base film 410 may be formed of a flexible material capable of transmitting light. In some embodiments, a retardation effect of the base film 410 may be zero. In some embodiments, an in-plane retardation value (Rin) and a thickness direction retardation value (Rth) of the base film 410 may be about 10 nm or less.

The base film 410 may be formed of an elastomer (EL). The elastomer (EL) may include a polymer compound having an elastic property. The base film 410 may also be formed of polyurethane (PU) (a polymer compound bonded by a urethane bond) or other similar materials. It should be noted that the folding functions and flexibility of the foldable display device 100 may be improved by forming the base film 410 out of elastomer (EL) or polyurethane (PU). In some embodiments, the base film 410 may have a thickness of about 20 um.

Figure 7:
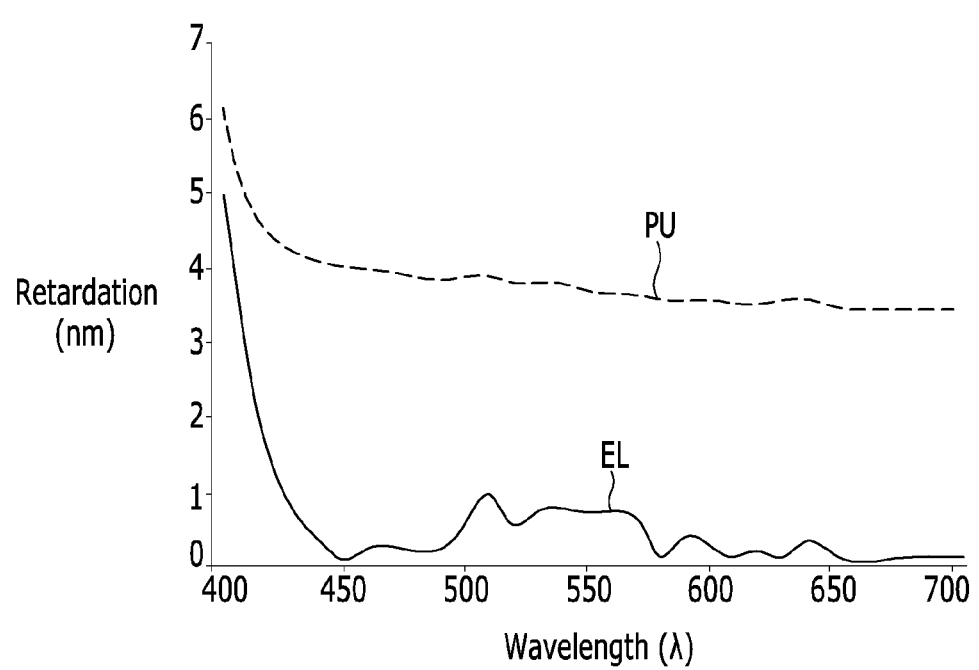
FIG. 7 is a graph of the retardation values (Rin) of an elastomer (EL) and polyurethane (PU) as a function of wavelength, whereby the elastomer (EL) and polyurethane (PU) may be used as a base film of an anti-reflection film according to an exemplary embodiment of the inventive concept.

FIG. 7 is a graph of the retardation values (Rin) of an elastomer (EL) and polyurethane (PU) as a function of wavelength. The elastomer (EL) and polyurethane (PU) may be used as a base film of the anti-reflection film 400 according to an exemplary embodiment of the inventive concept.

Referring to FIG. 7, it is observed that the retardation values (Rin) of the elastomer (EL) is less than 2 nm when the wavelength is greater than 450 nm. Also, the retardation values (Rin) of polyurethane (PU) is approximately 4 nm or less when the wavelength is greater than 450 nm. Accordingly, the elastomer (EL) and polyurethane (PU) are suitable for use in the base film 410.

Referring back to FIG. 6, the retardation coating layer 420 is designed to delay a phase of the transmitted light by λ/4. In other words, a phase difference of the retardation coating layer 420 is λ/4. The retardation coating layer 420 may be formed using a reactive liquid crystal monomer (e.g. reactive mesogens). Alternatively, in some embodiments, the retardation coating layer 420 may be formed using a photo-alignment or photo-reactive polymer.

Next, a method of forming the retardation coating layer 420 using a reactive liquid crystal monomer will be described.

First, an alignment layer (not illustrated) is formed on the base film 410. The alignment layer may be formed of an alignment material (such as polyimide or polyamide). More particularly, materials such as polyimide or polyamide may be applied on the base film 410, fired, and pressed by a roll in a particular alignment direction, thereby forming the alignment layer.

When the reactive liquid crystal monomers are applied onto the alignment layer, the reactive liquid crystal monomers arrange in the alignment direction of the alignment layer. Thus, the reactive liquid crystal monomers will be arranged in a predetermined direction according to the alignment direction.

The reactive liquid crystal monomers include a liquid crystal material including an end group capable of being polymerized. For example, the reactive liquid crystal monomers may include a monomer molecule including a terminal group that is capable of being polymerized with mesogen, and that expresses a liquid crystal property so as to have a liquid crystal phase. Generally, since a liquid crystal has both an alignment property of a crystal and the fluidity of a liquid, the liquid crystal may be uniformly applied onto a substrate having a large area with easy arraying of the liquid crystal molecules. When the reactive liquid crystal monomers (aligned in a liquid crystal phase) are polymerized, a cross-linked polymer network may be obtained while maintaining an arrangement phase of the liquid crystal. Calamitic mesogen expressing a nematic liquid crystal phase may be used as the mesogen to polarize the terminal group of the monomer molecule. In addition, an acryl group or a methacryl group (that can be subjected to radical polymerization) may be used as the terminal group to be polymerized. One of ordinary skill in the art would appreciate that any functional group capable of being polymerized may be used as the terminal group.

Next, a method of forming the retardation coating layer 420 using a photo-alignment or photo-reactive polymer will be described.

A liquid crystal polymer, a liquid crystal low molecule, or an oligomer having a photo-sensitive group exhibiting optical anisotropy and a mesogen-forming group exhibiting a liquid crystal property in a predetermined temperature section according to irradiation of linearly polarized light, or a mixture thereof, may be used as the photo-reactive polymer.

The photo-reactive polymer may be formed of a polymethacrylate-based main chain with one or more side chains connected to the main chain. Each side chain includes at least one liquid crystal material, and a photo-reactive material is provided as the terminal group of the side chain to cause a photo-isomerization reaction or a photo-dimerization reaction. In some embodiments, a hydrogen bond group may be provided as the terminal group.

An azobenzene group may be used as the liquid crystal material; and a cinnamate group, coumarin group, or benzylidenephthalimidine group may be used as the photo-reactive material. When the cinnamate group is included as a photo-reactive group in the photo-reactive material, a homopolymer having a liquid crystal group and the photo-reactive group formed of cinnamate may be bonded as a side chain to a main chain formed of polymethacrylate. The homopolymer including the cinnamate group and exhibiting the liquid crystal property through the hydrogen bond with the adjacent side chain may be bonded to the main chain formed of polymethacrylate. In some embodiments, a heteropolymer or a copolymer having the cinnamate group and the liquid crystal group and an additional liquid crystal group may be simultaneously bonded to a main chain formed of polymethacrylate.

The photo-reactive polymer may have a refractive anisotropy (dn) of about 0.08 to 0.20, and the retardation value of the retardation coating layer 420 may be adjusted by varying the thickness of the photo-reactive polymer.

When linearly polarized light is irradiated on the photo-reactive polymer, photo-isomerization and photo-dimerization reactions may occur in the photo-reactive polymer so as to cause anisotropy in the photo-reactive polymer. The optical anisotropy may be increased by heat-treating the photo-reactive polymer to arrange the photo-reactive polymer in a predetermined direction.

The photo-reactive polymer may be applied on the base film 410 and baked at a temperature of about 30 to 80° C. Linearly polarized light (such as ultraviolet rays) may be irradiated on the applied photo-reactive polymer, and the photo-reactive polymer is then fired at a temperature of 80 to 150° C. for about 10 minutes to form the retardation coating layer 420. Since a direction of an optical axis of the retardation coating layer 420 is perpendicular to a polarization direction of the ultraviolet rays, the direction of the optical axis of the retardation coating layer 420 may be modified by adjusting the polarization direction of the ultraviolet rays.

In some embodiments, the retardation coating layer 420 may be formed using a polyvinyl alcohol (PVA) coating method.

Figure 8:
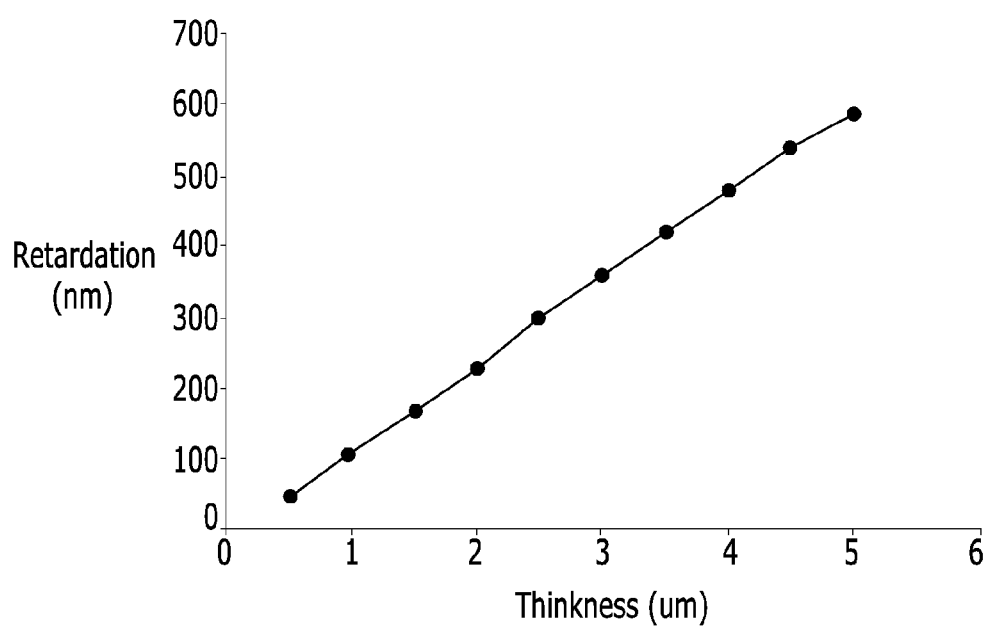
FIG. 8 is a graph of the retardation values of a retardation coating layer as a function of its thickness according to an exemplary embodiment of the inventive concept.

FIG. 8 is a graph of the retardation values of a retardation coating layer 420 as a function of its thickness according to an exemplary embodiment of the inventive concept. The retardation coating layer 420 includes a reactive liquid crystal monomer having a refractive anisotropy (dn) of 0.10 to 0.12. It can be observed from FIG. 8 that the retardation value increases with the thickness of the retardation coating layer 420.

The thickness of the retardation coating layer 420 may be set to about 1 to 2 um, so as to delay light transmitted through the retardation coating layer 420 by λ/4. For example, if the refractive anisotropy of the reactive liquid crystal monomer is 0.1 and the wavelength of light transmitted through the retardation coating layer 420 is 550 nm (which is an intermediate wavelength of a visible light region), the retardation value of light transmitted through the retardation coating layer 420 becomes 137.5 nm. The thickness of the retardation coating layer 420 corresponding thereto will then be about 1 to 2 um. Accordingly, the phase of light in the visible light region may be delayed by λ/4 when passing through the retardation coating layer 420 having a thickness of about 1 to 2 um.

Referring back to FIG. 6, the polarizer coating layer 430 transforms external light into linearly polarized light having a polarization component in a predetermined direction. Accordingly, the polarization component in the predetermined direction may be transmitted through the polarizer coating layer 430.

The polarizer coating layer 430 may be formed as a lyotropic type or a host-guest type.

For example, a liquid crystal including a lyotropic polymer may be applied on the fired retardation coating layer 420, and the lyotropic polymer may be arranged in a row using photo-alignment and then fired to form a lyotropic polarizer coating layer 430.

When a liquid crystal (a host) and a dichroic dye (a guest) are mixed, the host may be arranged in the alignment direction of a lower alignment layer (not illustrated) together with the guest (dichroic dye) and then fired to form a host-guest type polarizer coating layer 430. In this case, the lower alignment layer may be applied on the fired retardation coating layer 420 and fired, and the fired alignment layer may be pressed by a roll to form the lower alignment layer in the alignment direction. A perylene-based dye may be used as the dichroic dye. A smectic liquid crystal having a two-dimensional regular arrangement may be used as the liquid crystal. The smectic liquid crystal is a highly refractive liquid crystal (as compared to a nematic liquid crystal which has a predetermined arrangement in one dimension).

The over-coating layer 440 serves to protect the retardation coating layer 420 and the polarizer coating layer 430. An over-coating composition may be applied on the polarizer coating layer 430 and then baked to form the over-coating layer 440. Acryl-based and silicon-based oxide layers (or other similar materials) may be used as the over-coating layer 440. A UV (ultraviolet)-absorber capable of absorbing light of an ultraviolet ray region may be added to the over-coating layer 440. Examples of the UV-absorber include hydroxyphenyl-benztriazole, hydroxyphenyl-benzophenone, oxalic acid amide, triazine, oxalanilide, cyanoacrylate, salicylic acid, hydroxyphenylpyrimidine, or other similar materials. The over-coating layer 440 may be formed having a thickness of about 1 um.

Figure 9:
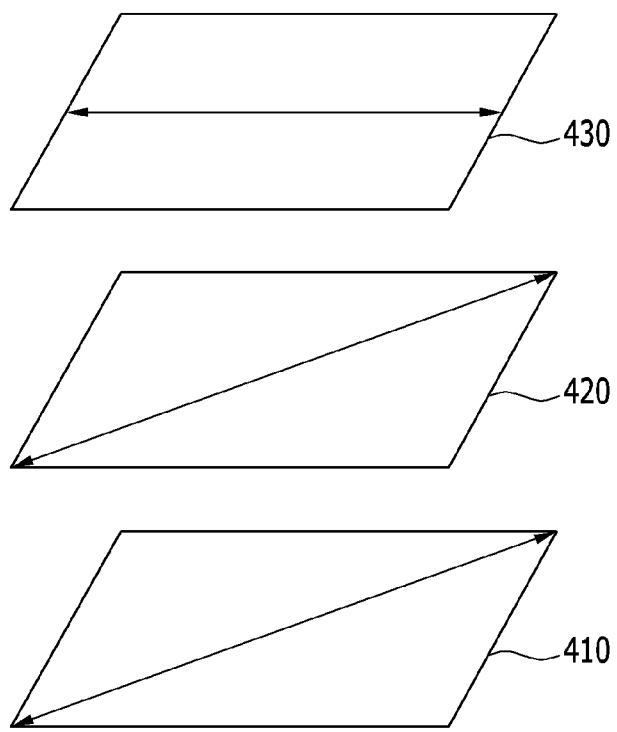
FIG. 9 illustrates the directions of the optical axes of a base film, a retardation coating layer, and a polarizer coating layer in the anti-reflection film according to an exemplary embodiment of the inventive concept.

FIG. 9 illustrates the directions of the optical axes of the base film 410, the retardation coating layer 420, and the polarizer coating layer 430 in the anti-reflection film 400 according to an exemplary embodiment of the inventive concept.

Referring to FIG. 9, an arrow is illustrated in each of the base film 410, the retardation coating layer 420, and the polarizer coating layer 430. Each arrow represents a direction of the optical axis. As illustrated in FIG. 9, the directions of the optical axes of the retardation coating layer 420 and the polarizer coating layer 430 form an angle of 45°. Since the retardation value of the base film 410 is 10 nm or less, the retardation value does not affect an optical characteristic of the base film 410. However, to minimize a change in optical characteristic during the manufacture of the touch screen panel 300 (or during folding of the touch screen panel 300), the direction of the optical axis of the base film 410 may be the same as the direction of the retardation coating layer 420.

In the anti-reflection film 400 described above, the phase of light that is incident from below the retardation coating layer 420 is delayed by λ/4 after passing through the retardation coating layer 420. The light is then transformed into linearly polarized light after passing through the polarizer coating layer 430, and the linearly polarized light is transmitted through the anti-reflection film 400. Conversely, light that is incident from above the anti-reflection film 400 transforms into linearly polarized light having only the polarization component in the predetermined direction while being transmitted through the polarizer coating layer 430.

For the case in which the light is incident from above the anti-reflection film 400, the polarization direction of the linearly polarized light is parallel to the polarization direction of the polarizer coating layer 430. The linearly polarized light is transformed into circularly polarized light while passing through the retardation coating layer 420. Thereafter, the circularly polarized light is reflected on the touch screen panel 300 or the display panel 200 disposed beneath the anti-reflection film 400, and subsequently the polarization direction of the circularly polarized light is inverted. For example, left circular polarization is changed into right circular polarization, and right circular polarization is changed into left circular polarization. Circularly polarized light having the changed polarization direction is transformed into linearly polarized light after passing through the retardation coating layer 420 a second time, and the polarization direction of the linearly polarized light is perpendicular to the previous polarization direction (when the light first passed through the polarizer coating layer 430 at an initial stage). Accordingly, the linearly polarized light (that is transformed while passing through the retardation coating layer 420 a second time) does not pass through the polarizer coating layer 430 but is instead absorbed in the polarizer coating layer 430.

Accordingly, light that is incident on the anti-reflection film 400 from the outside is not emitted through the anti-reflection film 400, but light that is incident on the anti-reflection film 400 from the display panel 200 beneath the anti-reflection film 400 may pass through the anti-reflection film 400. Accordingly, a viewer can observe a clear image (since an external light component is removed).

Next, the differences between a conventional anti-reflection film and the exemplary anti-reflection film 400 will be described.

A conventional anti-reflection film may be formed by attaching a retardation film (formed of elongating polycarbonate (PC)) and a polarization film (having polyvinyl alcohol (PVA) as a main component) together using an adhesive, and disposing a protective film (formed of triacetylcellulose (TAC)) on the polarization film. In the conventional anti-reflection film, the thickness of the retardation film is about 50 um, the thickness of the polarization film is about 12 um, the thickness of the adhesive is about 10 um, and the thickness of the protective film is 25 um. Accordingly, the total thickness of the conventional anti-reflection film may be about 97 um.

In contrast to the conventional anti-reflection film, the total thickness of the anti-reflection film 400 may be about 26 um or less. This is because the anti-reflection film 400 has a thickness that is about ¼ the thickness of the conventional anti-reflection film. As a result, a foldable display device including the anti-reflection film 400 may have a reduced bending radius and better bendability compared to a conventional foldable display device.

Figure 10:
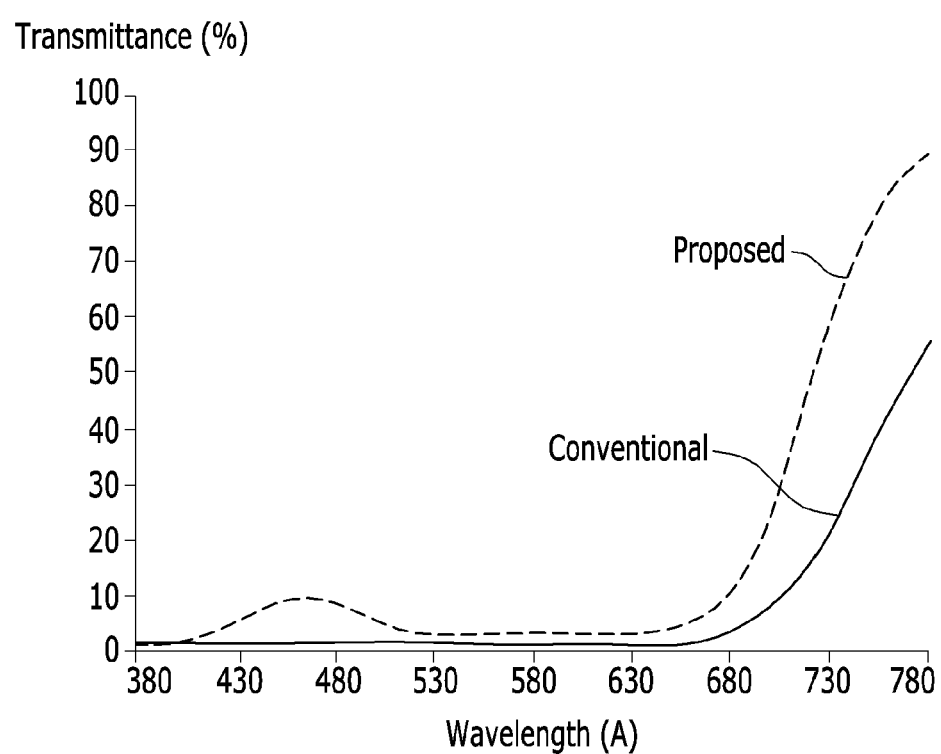
FIG. 10 is a graph of the measured transmittance of an anti-reflection film as a function of wavelength according to an exemplary embodiment of the inventive concept.

FIG. 10 is a graph of the measured transmittance of light through the anti-reflection film 400 as a function of wavelength.

Referring to FIG. 10, it is observed that there is no significant difference between the transmittance of a conventional anti-reflection film and the transmittance of the anti-reflection film 400 when the wavelength is less than about 680 nm.

In the anti-reflection film 400, the transmittance of light in the wavelength region of 400 to 480 nm is slightly higher because the UV-absorber is not added to the over-coating layer 440. If the UV-absorber is added to the over-coating layer 440, the transmittance of light in the wavelength region of 400 to 480 nm may be reduced. High transmittance of light having a wavelength of 680 nm or greater is caused by a reduction in dichroic ratio of the dichroic dye in the polarizer coating layer 430. The transmittance may be compensated by adjusting the dichroic ratio of the dichroic dye in the corresponding wavelength region.

Next, different embodiments of the anti-reflection film 400 will be described with reference to FIGS. 11 to 17. In the interest of clarity, the description will focus on the differences between the embodiments in FIGS. 11 to 17 and the embodiment in FIG. 6.

Figure 11:
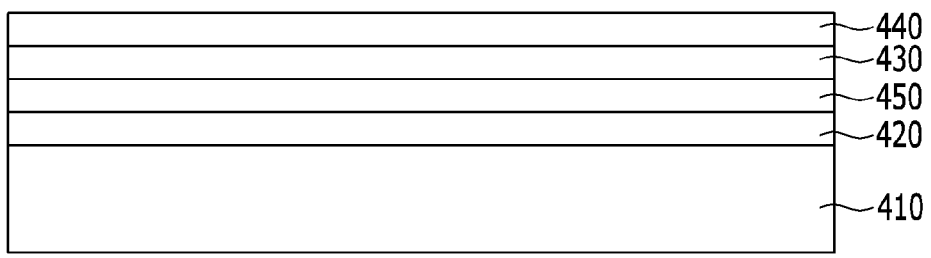
FIG. 11 is a cross-sectional view of an anti-reflection film according to another exemplary embodiment of the inventive concept.

FIG. 11 is a cross-sectional view of an anti-reflection film 400 according to another exemplary embodiment of the inventive concept.

Referring to FIG. 11, the anti-reflection film 400 includes a base film 410, a retardation coating layer 420 disposed on the base film 410, a second over-coating layer 450 disposed on the retardation coating layer 420, a polarizer coating layer 430 disposed on the second over-coating layer 450, and a first over-coating layer 440 disposed on the polarizer coating layer 430.

In contrast to FIG. 6, the embodiment in FIG. 11 includes the second over-coating layer 450 disposed between the retardation coating layer 420 and the polarizer coating layer 430. An over-coating composition may be applied on the retardation coating layer 420 and then baked to form the second over-coating layer 450. The second over-coating layer 450 protects a liquid crystal layer of the retardation coating layer 420 (that is formed using a reactive liquid crystal monomer or a photo-reactive polymer). The second over-coating layer 450 may be formed having a thickness of about 1 um.

It is noted that the reliability and processability of the retardation coating layer 420 may be improved by disposing the second over-coating layer 450 on the retardation coating layer 420.

Figure 12:
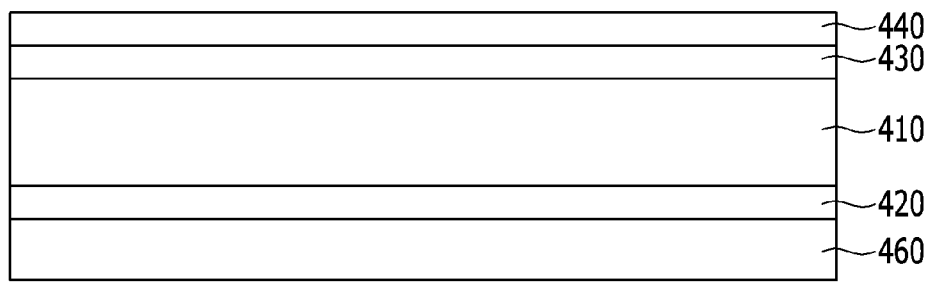
FIG. 12 is a cross-sectional view of an anti-reflection film according to another exemplary embodiment of the inventive concept.

FIG. 12 is a cross-sectional view of an anti-reflection film 400 according to another exemplary embodiment of the inventive concept.

Referring to FIG. 12, the anti-reflection film 400 includes a base film 410, a polarizer coating layer 430 disposed on the base film 410, an over-coating layer 440 disposed on the polarizer coating layer 430, a retardation coating layer 420 disposed beneath the base film 410, and an insulating coating layer 460 disposed beneath the retardation coating layer 420.

In contrast to FIG. 6, the polarizer coating layer 430 in FIG. 12 is disposed on one side of the base film 410, the retardation coating layer 420 is disposed on the other side of the base film 410, and the retardation coating layer 420 is disposed between the insulating coating layer 460 and the base film 410. The over-coating layer 440 is disposed on the polarizer coating layer 430 on one side of the base film 410. The insulating coating layer 460 is disposed on the retardation coating layer 420 on the other side of the base film 410.

The insulating coating layer 460 may be formed of polyimide. The insulating coating layer 460 may be attached to a touch screen panel 300. Alternatively, the insulating coating layer 460 may be removed when the anti-reflection film 400 and the touch screen panel 300 adhere to each other.

The physical properties and an alignment angle of the retardation coating layer 420 may be changed by irradiating light during the forming of the polarizer coating layer 430. The changes in the physical properties and the alignment angle of the retardation coating layer 420 depend on the type of liquid crystal material used in the retardation coating layer 420. Nevertheless, changes in the physical properties and the alignment angle of the retardation coating layer 420 may be prevented by disposing the retardation coating layer 420 on a side that is different from (opposite to) the side where the polarizer coating layer 430 is disposed.

Figure 13:
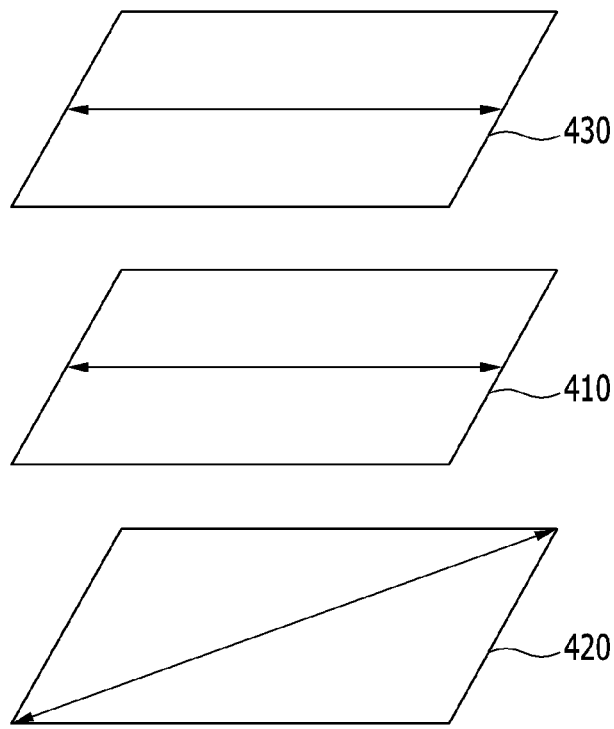
FIG. 13 illustrates the directions of the optical axes of the base film, the retardation coating layer, and the polarizer coating layer in the anti-reflection film of FIG. 12.

FIG. 13 illustrates the directions of the optical axes of the base film, the retardation coating layer, and the polarizer coating layer in the anti-reflection film of FIG. 12.

Referring to FIG. 13, when the polarizer coating layer 430 is disposed on the base film 410 and the retardation coating layer 420 is disposed beneath the base film 410 (as in FIG. 12), the directions of the optical axes of the polarizer coating layer 430 and the retardation coating layer 420 may form an angle of 45°, and the direction of the optical axis of the base film 410 may be the same as the direction of the polarizer coating layer 430.

Since a retardation value of the base film 410 is 10 nm or less, the retardation value does not affect an optical characteristic of the base film 410. However, the direction of the optical axis of the base film 410 may be the same as the direction of the polarizer coating layer 430, so as to minimize a change in the optical characteristic during the manufacture of the touch screen panel 300 (or during folding of the touch screen panel 300).

Figure 14:
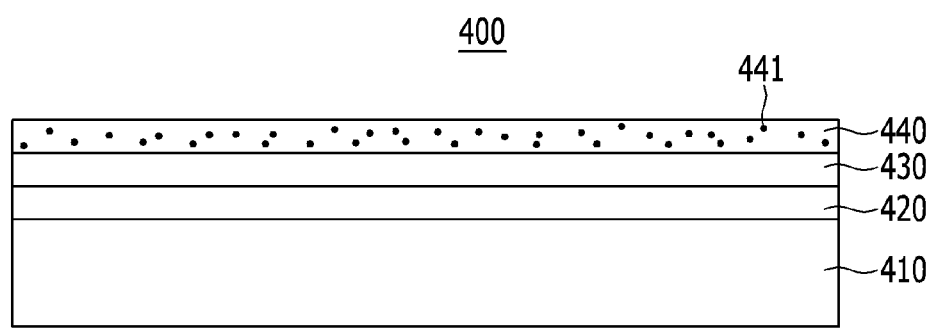
FIG. 14 is a cross-sectional view of an anti-reflection film according to another exemplary embodiment of the inventive concept.

FIG. 14 is a cross-sectional view of an anti-reflection film 400 according to another exemplary embodiment of the inventive concept.

Referring to FIG. 14, the anti-reflection film 400 includes a base film 410, a retardation coating layer 420 disposed on the base film 410, a polarizer coating layer 430 disposed on the retardation coating layer 420, and an over-coating layer 440 disposed on the polarizer coating layer 430. Particles 441 for antiglare, as well as a UV-absorber, may be added to the over-coating layer 440. Silica (or other similar materials) may be used as the particles 441 for antiglare. Thus, an antiglare function may be added to the over-coating layer 440 to adjust a haze, surface roughness, etc.

Figure 15:
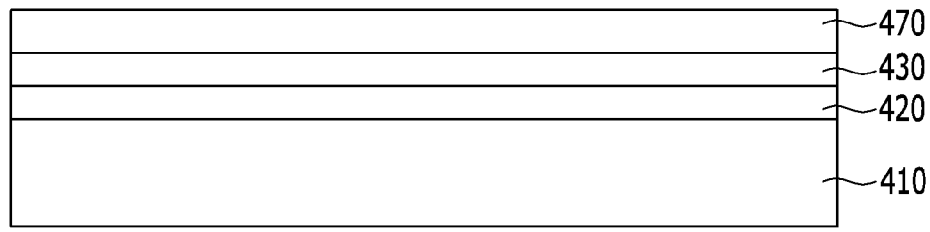
FIG. 15 is a cross-sectional view of an anti-reflection film according to another exemplary embodiment of the inventive concept.

FIG. 15 is a cross-sectional view of an anti-reflection film 400 according to another exemplary embodiment of the inventive concept.

Referring to FIG. 15, the anti-reflection film 400 includes a base film 410, a retardation coating layer 420 disposed on the base film 410, a polarizer coating layer 430 disposed on the retardation coating layer 420, and an optical coating layer 470 disposed on the polarizer coating layer 430. The optical coating layer 470 may include at least one of a low reflectance coating, an anti-reflection coating, and an anti-fingerprint coating. A UV-absorber may be added to the optical coating layer 470. The low reflectance coating, the anti-reflection coating, and the anti-fingerprint coating may be formed using methods known to one of ordinary skill in the art, and a detailed description thereof will be omitted.

Figure 16:
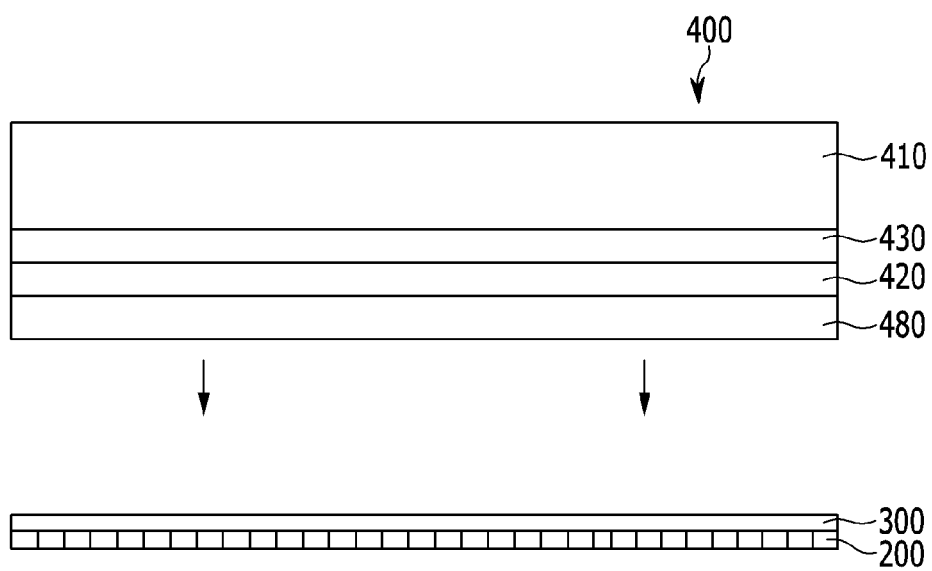
FIG. 16 is a cross-sectional view of an anti-reflection film according to another exemplary embodiment of the inventive concept.

FIG. 16 is a cross-sectional view of an anti-reflection film 400 according to another exemplary embodiment of the inventive concept.

Referring to FIG. 16, the anti-reflection film 400 includes a base film 410, a polarizer coating layer 430 disposed beneath the base film 410, a retardation coating layer 420 disposed beneath the polarizer coating layer 430, and an adhesive layer 480 disposed beneath the retardation coating layer 420. The anti-reflection film 400 is attached to a touch screen panel 300 by the adhesive layer 480.

The anti-reflection film 400 may be manufactured by forming the polarizer coating layer 430 on the base film 410, forming the retardation coating layer 420 on the polarizer coating layer 430, and forming the adhesive layer 480 on the retardation coating layer 420. The method of forming the polarizer coating layer 430 and the retardation coating layer 420 is similar to the embodiment previously described in FIG. 6. The adhesive layer 480 may be formed by applying an adhesive material on the retardation coating layer 420.

The anti-reflection film 400 may be attached to the touch screen panel 300 with the adhesive layer 480 disposed between the touch screen panel 300 and the anti-reflection film 400.

Accordingly, after assembly, the touch screen panel 300 is disposed on a display panel 200, the adhesive layer 480 is disposed on the touch screen panel 300, the retardation coating layer 420 is disposed on the adhesive layer 480, the polarizer coating layer 430 is disposed on the retardation coating layer 420, and the base film 410 is disposed on the polarizer coating layer 430.

Figure 17:
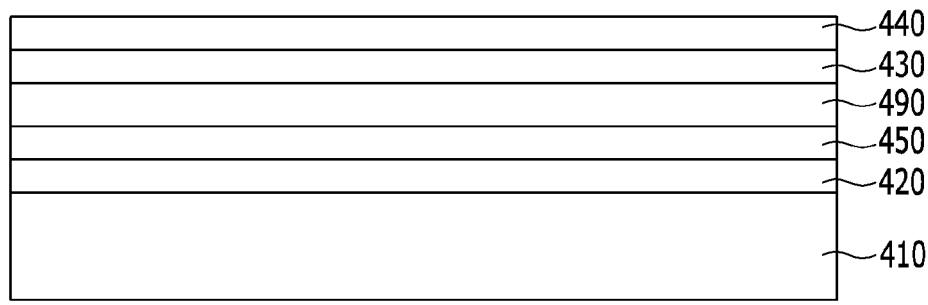
FIG. 17 is a cross-sectional view of an anti-reflection film according to another exemplary embodiment of the inventive concept.

FIG. 17 is a cross-sectional view of an anti-reflection film 400 according to another exemplary embodiment of the inventive concept.

Referring to FIG. 17, the anti-reflection film 400 includes a base film 410, a first retardation coating layer 420 disposed on the base film 410, a second over-coating layer 450 disposed on the first retardation coating layer 420, a second retardation coating layer 490 disposed on the second over-coating layer 450, a polarizer coating layer 430 disposed on the second retardation coating layer 490, and a first over-coating layer 440 disposed on the polarizer coating layer 430.

The first retardation coating layer 420 delays a phase of incident light by $\lambda/4$, and the second retardation coating layer 490 delays the phase of incident light by $\lambda/2$. The method of forming the first retardation coating layer 420 is similar to the embodiment previously described in FIG. 6. For example, the second retardation coating layer 490 may be formed using the same method for forming the first retardation coating layer 420. An axis of a sum of vectors of the direction of an optical axis of the first retardation coating layer 420 and the direction of the optical axis of the second retardation coating layer 490 has an angle of 45° to the direction of the optical axis of the polarizer coating layer 430. For example, the direction of the optical axis of the polarizer coating layer 430 may have an angle of 45°, the direction of the optical axis of the first retardation coating layer 420 may have an angle of 120°, and the direction of the optical axis of the second retardation coating layer 490 may have an angle of 60°.

The anti-reflection film 400 (including the first retardation coating layer 420 and the second retardation coating layer 490) allows light that is incident from under the anti-reflection film 400 to be transmitted through, and blocks light that is incident from above the anti-reflection film 400. As a result, the light that is incident from above the anti-reflection film 400 is reflected. Accordingly, the second retardation coating layer 490 may expand a bandwidth of the transmitted light. That is, in the case where only the first retardation coating layer 420 is formed, light having a predetermined wavelength is transmitted through the anti-reflection film 400. In contrast, the anti-reflection film 400 including the first retardation coating layer 420 and the second retardation coating layer 490 may allow light having a wider wavelength to be transmitted therethrough.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements within the spirit and scope of the present disclosure.

What is claimed is:

1. A display device comprising:
an anti-reflection film, wherein the anti-reflection film includes:
a base film formed of a flexible material selected from a group consisting of an elastomer and polyurethane;
a retardation coating layer disposed on a first side of the base film and configured to delay a phase of transmitted light; and
a polarizer coating layer disposed on a second side of the base film and configured to pass through a component of the transmitted light polarized in a specific direction,
wherein the retardation coating layer and the polarizer coating layer are formed by applying a liquid crystal on the base film,
wherein the base film has an in-plane retardation value (Rin) of 4 nm or less when a wavelength of the transmitted light is greater than 450 nm, and
wherein the base film has a thickness-direction retardation value (Rth) of 10 nm or less.

2. The display device of claim 1, wherein the polarizer coating layer is disposed on the base film, and the retardation coating layer is disposed beneath the base film.

3. The display device of claim 2, wherein the anti-reflection film further includes:
an over-coating layer disposed on the polarizer coating layer; and
an insulating coating layer disposed beneath the retardation coating layer.

4. The display device of claim 3, further comprising:
a touch screen panel, wherein the insulating coating layer is attached to the touch screen panel.

5. The display device of claim 2, wherein:
the retardation coating layer delays the phase of the transmitted light by a quarter wavelength ($\lambda/4$),
a first direction of an optical transmission axis of the retardation coating layer and a second direction of an optical transmission axis of the polarizer coating layer form an angle of 45°, and
a third direction of an optical transmission axis of the base film is the same as the second direction of the optical transmission axis of the polarizer coating layer.

* * * * *